219-121
10/17/78 XR 4,121,083

United States Patent [19] [11] 4,121,083
Smyth [45] Oct. 17, 1978

[54] METHOD AND APPARATUS FOR PLASMA FLAME-SPRAYING COATING MATERIAL ONTO A SUBSTRATE

[75] Inventor: Richard T. Smyth, Huntington, N.Y.
[73] Assignee: Metco, Inc., Westbury, Long Island, N.Y.

[21] Appl. No.: 791,479
[22] Filed: Apr. 27, 1977
[51] Int. Cl.[2] .................... B23K 9/04
[52] U.S. Cl. .................... 219/76.16; 219/121 P; 427/34
[58] Field of Search .................... 219/75, 76.16, 121 P, 219/76.11, 76; 427/34

[56] References Cited

U.S. PATENT DOCUMENTS 3,082,314 3/1963 Arata .................... 219/75
3,373,306 3/1968 Karlovitz .................... 219/75 X
3,470,347 9/1969 Jackson .................... 219/76.16

FOREIGN PATENT DOCUMENTS 345,653 3/1922 Fed. Rep. of Germany .................... 427/34

*Primary Examiner*—E. A. Goldberg
*Attorney, Agent, or Firm*—Salvatore A. Giarratana; E. T. Grimes; F. L. Masselle

[57] ABSTRACT

Method and apparatus for plasma flame-spraying coating material onto a substrate by means of passing a plasma-forming gas through a nozzle electrode, passing an arc-forming current between said nozzle electrode and a rear electrode to form a plasma effluent, introducing coating material into the plasma effluent, passing the plasma effluent axially through a wall shroud extending from the exit of said nozzle electrode and forming a flame shroud for the plasma effluent at least within the wall shroud.

42 Claims, 9 Drawing Figures

FIG. 4

TABLE OF PLASMA SPRAY GUN TEST RESULTS

| TYPE OF PLASMA SPRAY GUN | COATING MATERIAL | FEED RATE LB/HR | DEPOSIT EFFICIENCY % | UNMELTED PARTICLES % | OXIDE % | HARDNESS Rc | WEAR RESISTANCE x1 |
|---|---|---|---|---|---|---|---|
| CONVENTIONAL | COBALT BASE ALLOY | 6.5 | 70 | 25 | 10 | 35 | |
| INVENTION | COBALT BASE ALLOY | 6.0 | 95 | 0 | 1.0 | 39 | |
| INVENTION | COBALT BASE ALLOY | 24.0 | 76 | 14 | 1.5 | 36 | |
| CONVENTIONAL | IRON + MOLYBDENUM | 10 | 60 | 1 | 7.5 | 49 | 1.0 |
| INVENTION | IRON + MOLYBDENUM | 10 | 75 | 3 | 1.5 | 59 | 1.2 |
| CONVENTIONAL | TUNGSTEN CARBIDE + 12 COBALT | 8 | 70 | 9 | – | 60 | 1.0 |
| INVENTION | TUNGSTEN CARBIDE + 12 COBALT | 12 | 93 | 2.5 | – | 51 | 1.7 |
| CONVENTIONAL | TUNGSTEN CARBIDE + 17 COBALT | 6 | 60 | 0 | – | 57 | 1.0 |
| INVENTION | TUNGSTEN CARBIDE + 17 COBALT | 9 | 72 | 0 | – | 63 | 2.1 |
| CONVENTIONAL | IRON | 10 | 60 | 0.5 | 16 | 47 | 1.0 |
| INVENTION | IRON | 10 | 95 | 0 | 1 | 62 | 1.8 |
| CONVENTIONAL | $Al_2O_3 + TiO_2$ | 3 | 70 | 5 | – | 70 | 1.0 |
| INVENTION | $Al_2O_3 + TiO_2$ | 3 | 65 | 9 | – | 63 | 1.3 |
| INVENTION | $Al_2O_3 + TiO_2$ | 12 | 94 | 7 | – | 67 | |
| INVENTION | NICKEL BASE ALLOY | 10.5 | 76 | 4.5 | 0.5 | 65 | |

METHOD AND APPARATUS FOR PLASMA FLAME-SPRAYING COATING MATERIAL ONTO A SUBSTRATE

BACKGROUND OF THE INVENTION

This invention relates to the application of coatings onto substrates by plasma spray techniques, and more particularly, to method and apparatus for shielding the effluent from plasma spray gun assemblies from contamination by the surrounding environment.

Plasma spray gun assemblies are known which use an electric arc to excite a gas, thereby producing a thermal plasma of very high temperatures. Spray or powdered materials are introduced into the thermal plasma, melted and projected onto a substrate or base to form coatings. Such powdered materials may include metals, metal alloys, ceramics such as metal oxides, and carbides or the like, for example.

Heretofore, difficulties were experienced due to contamination of the effluent from the nozzle of the spray gun, such as air entrapment, for example, that resulted in significant oxidation of the coating materials. The spraying conditions, particularly heat and velocity, were often adjusted to a compromise to heat the powder just enough to melt it. Attempts have been made to overcome this problem, but they have been only moderately successful. Once such attempt involved completely enclosing the apparatus in a chamber, but this was expensive and also very cumbersome. In other installations, efforts were made to use a gas shroud to solve the problem. For example, the Jackson U.S. Pat. No. 3,470,347 shows the use of a coaxial annular stream of unheated gas. However, this required a relatively large flow of gas, such as argon, which is expensive. In addition, there was a tendancy with such prior art devices to build up a coating on the shrouding device. Other related patents in this art include Anderson et al, U.S. Pat. No. 2,951,143; Yoshiaki Arata et al, U.S. Pat. No. 3,082,314; and Unger et al, U.S. Pat. No. 3,313,909, for example.

SUMMARY OF THE INVENTION

The basic and general object of the present invention is the provision of a new and improved method and apparatus, which overcomes or at least mitigates some of the problems of the prior art.

A more specific object is the provision of method and apparatus which provides improvements in one or more of the following aspects: higher deposition efficiency; reduced oxygen content in the effluent for metallic materials; reduced unmelted particle inclusions; increased feed rates; and improved quality of the coating.

To the accomplishment of the foregoing objectives, and additional objective and advantages, which will become apparent as this description proceeds, the invention contemplates, in one form thereof, the provision of a new and improved plasma spray gun assembly for coating substrates which includes, in combination, a nozzle electrode having a nozzle passage therethrough, a rear electrode, and means for passing plasma-forming gas through the nozzle electrode. In addition, the assembly includes means for passing an arc-forming current between the electrodes to form a plasma effluent, and means for introducing coating material into the plasma effluent. Further, the assembly according to the invention, includes a wall shroud for the plasma effluent extending from the exit of the nozzle electrode, and means for forming a flame shroud for the plasma effluent within the wall shroud and in some instances extending beyond the wall shroud.

In one preferred form of the invention, the flame shroud is directed at an angle of between about 160° and about 180° with respect to the axis of the plasma effluent, and more preferably, the flame shroud is directed at an angle of about 180° with respect to the axis of the plasma effluent.

According to an aspect of the invention, the wall shroud is cylindrical and means are provided for water cooling this shroud.

In one form of the invention, the means for forming a flame shroud for the plasma effluent at least within the wall shroud comprises burner means disposed adjacent the outlet of the wall shroud. According to an aspect of the invention, the gas in the burner means is a combustible mixture such as, for example, air or oxygen mixed with propane, acetylene, APACHI gas as manufactured by Air Products Inc., MAPP gas as manufactured by Dow Chemical Company, or hydrogen. Preferably, high molecular weight gases are employed. It is desirable in some installations to preheat this gas. Also, in some installations, a combustible liquid is used.

In another form of the invention, an annular manifold is mounted adjacent the outer end of the wall shroud, which has jet orifice means for providing an annular curtain effect around the plasma flame as it leaves the wall shroud and passes towards the target substrate.

The invention, in another form thereof, is directed to a process for plasma flame-spraying coating material onto a substrate, which includes the steps of: passing a plasma-forming gas through a nozzle electrode, and passing an arc-forming current between the nozzle electrode and a rear electrode to form a plasma effluent. The process further includes the steps of introducing coating material into the plasma effluent, passing the plasma effluent through a wall shroud extending from the exit of the nozzle electrode, and forming a flame shroud for the plasma effluent within the wall shroud. It will be appreciated that the coating material may be in any form suitable for plasma spraying such as, for example, a solid wire or rod. However, powder is preferable. The powder may be free flowing or in a binder such as a plastic bonded wire or the like, for example. The spray material introduced into the plasma effluent may be introduced at any convenient location, including one upstream of the arc. However, it is generally introduced at a point downstream of the arc, and preferably, adjacent the nozzle exit on the downstream side thereof. Further, several points of introduction may be utilized, simultaneously.

According to the invention, the flame shroud is preferably directed at an angle of about 180° with respect to the axis of the plasma effluent. As another aspect of the invention, the process includes the step of forming an annular fluid curtain around the plasma effluent as it leaves the plasma spray gun assembly.

There has thus been outlined rather broadly the more important features of the invention in order that the detailed description thereof that follows may be better understood, and in order that the present contribution to the art may be better appreciated. There are, of course, additional features of the invention which will be described more fully hereinafter. Those skilled in the art will appreciate that the conception on which this disclosure is based may readily be utilized as the basis for the design of other methods and apparatus for carrying out the several purposes of the invention. It is important, therefore, that this disclosure be regarded as including such equivalent methods and apparatus as do not depart from the spirit and scope of the invention.

Several embodiments of the invention have been chosen for purposes of illustration and description, and are shown in the accompanying drawings, forming a part of the specification.

BRIEF DESCRIPTION OF THE DRAWINGS

FIG. 4 is a table showing comparative test results of a plasma flame spray gun according to the invention with respect to conventional guns.

DETAILED DESCRIPTION OF THE PREFERRED EMBODIMENTS

Figure 1:
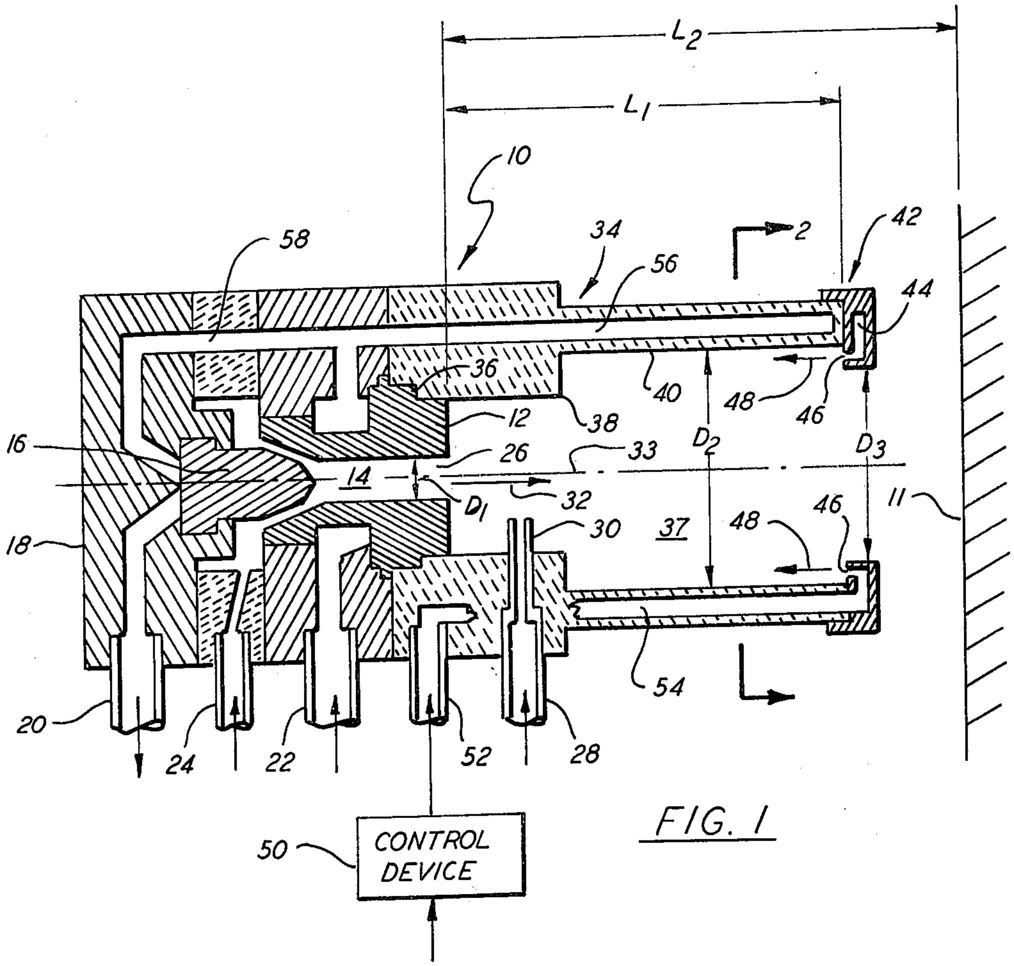
FIG. 1 is a medial sectional view of a plasma flame spray gun assembly constructed in accordance with the concepts of the present invention.
Figure 2:
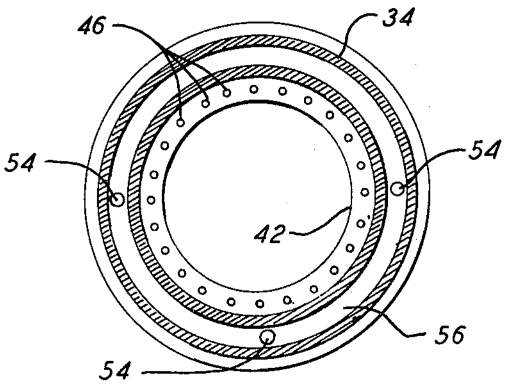
FIG. 2 is a sectional view taken along the line indicated at 2—2 in FIG. 1.

In the embodiment of the invention illustrated in FIGS. 1 and 2, a plasma spray gun assembly, indicated generally at 10, for coating a substrate 11, includes a nozzle electrode 12 having a nozzle bore or passage 14 therethrough, and a rear electrode 16 mounted on an electrode holder 18. Electrical cable connections 20 and 22 serve to connect the electrode to a suitable electrical source. A plasma-forming gas such as nitrogen, argon, helium, hydrogen or the like, for example, is passed from a suitable pressure source through a connector 24 into the space 14 around the tip of the electrode 16, through an annular passage formed by the electrode tip and the tapered portion of the nozzle. The current is caused to flow from the connector 20 through the electrode holder 18 to the electrode 16 and from the tip of the electrode 16 in the form of an arc to the nozzle 12 and then to connector 22, to thereby form a very hot plasma flame which extends out through the exit 26 of the nozzle electrode 12. One or more secondary gases can be mixed with the primary gas, if desired.

Heat fusible powdered coating material, such as powdered metal, or ceramics or the like, for example, is entrained in a carrier gas, which, for example, may be a gas such as nitrogen, helium, argon, or even air, received from a suitable source through a connection 28 provided for the purpose. In the embodiment illustrated, the powdered material is injected into the plasma flame adjacent the nozzle exit 26, as by means of the nozzle 30. As a result, in operation, the plasma effluent or flame with the powdered material carried therewith passes in the direction indicated by arrow 32 at a very high velocity, the axis thereof being indicated at 33.

According to the invention, an annularly-shaped wall shroud, indicated at 34, is mounted on the nozzle 12 adjacent the nozzle exit 36 to form a shroud chamber 37. In the embodiment illustrated, the wall shroud 34 is cylindrical, having an inner step portion 38 and an outer step portion 40.

Still referring to FIG. 1, a gas burner, indicated generally at 42, is mounted at the outer end of the wall shroud 34, which includes an annular plenum chamber 44 feeding a plurality of jet orifices 46 that are directed at an angle of between about 160° and about 180° with respect to the axis 33 of the plasma effluent or flame. Preferably, the jet orifices are directed at an angle of about 180° with respect to the axis 33 of the plasma flame to form an annularly-shaped combustion flame shroud within the chamber 37, adjacent the wall shroud, as indicated by arrows 48. Alternatively, the jet orifices may be in the form of a continuous narrow annular slit-like opening. The combustion gases for the flame shroud are fed to the plenum chamber 44 through a control device 50, a combustion gas inlet 52 and tubes 54 within the wall shroud 34. The function of the control device will be explained more fully hereinafter.

Due to the high temperatures involved with plasma spray guns of this nature, water cooling is provided. The electrical cable connections 20 and 22 are constructed so as to receive water cooled electric cables through which cooling water is forced. This cooling water flows through the connection 22 and around the nozzle 12, and then outwardly through one side and then inwardly through the other side of a water jacket 56 to cool the wall shroud 34. The cooling water thereafter is directed through a passage 58 to cool the electrode 16 before passing out of the system through the connection 20.

It will be appreciated that the flame shroud, as indicated by arrow 48, within the wall shroud 34 is directed towards the exit flow of the arc plasma flame, as indicated by the arrow 32. The combination of these two flows, together with the high temperature of the flame gases satisfies the arc plasma jet's characteristic aspiration of the surrounding atmosphere without the plasma jet being either quenched by a cold gas stream or entraining air, which otherwise has a propensity to produce an uncontrolled oxidizing reaction with the material being sprayed. Any suitable combustion mixture may be employed. However, it has been found desirable to utilize a high molecular weight gas in order to provide substantial expansion characteristics and a relatively large quantity of combustion products. Presently preferred combustion mixtures include air or oxygen mixed with acetylene, propane, APACHI gas as manufactured by Air Products Inc., MAPP gas as manufactured by Dow Chemical Company, or hydrogen. The control device serves to control the characteristics of the gas supplied to the plenum chamber 44. It is desirable in some installations to preheat the combustion mixture. Moreover, depending on the particular material being sprayed, the combustion gases may be adjusted to provide either oxidizing, neutral or reducing atmosphere both within the chamber 37 and beyond the exit thereof. This enables the chemical composition of the spray coating to be controlled such as, for example, controlling the carbon content of carbides, iron or the like and, also, compounds such as barium titanate may be sprayed without the usual reduction of oxygen content. In general, the spraying of metals requires a reducing atmosphere, whereas when spraying ceramics, it is desirable to provide an excess of oxygen.

In order to fully illustrate the nature of the invention, FIG. 4 presents a table indicating the comparative test results, spraying the same material, of a conventional plasma spray gun assembly without shrouding and a plasma spray gun assembly constructed according to the invention, which includes an annularly-shaped wall shroud and an annularly-shaped flame shroud within and adjacent the wall shroud, directed at an angle of about 180° with respect to the axis of the plasma flame. The wear resistance specified in the table of FIG. 4 was determined according to test procedures. The test results show a clear superiority of the spray gun assembly of the present invention.

The following example describes the typical operation of the plasma spray gun assembly.

EXAMLPLE 1

A plasma spray gun assembly similar to that shown in FIGS. 1 and 2 was used. A bore diameter $D_1$ of the nozzle electrode 12 was 0.25 inches. The inside diameter $D_2$ of the wall shroud 34 was 1.50 inches and the inside diameter $D_3$ of the gas burner 42 was 1.15 inches. The distance $L_1$ between the end of the nozzle 12 and the inner end of the gas burner 42 was 1.70 inches and the distance $L_2$ between the end of the nozzle electrode 12 and the substrate or work piece 11 was 2.75 inches. The diameter of the nozzle 30 for the powdered coating material was 0.060 inches. Thirty-six jet orifices 46 having a diameter of 0.028 inches were employed on a 1.38 inch diameter circle. The plasma gases utilized were argon, at a pressure of 100 p.s.i.g. and a flow rate of 90 s.c.f.h. and hydrogen at a pressure of 60 p.s.i.g. at a flow rate of 7 s.c.f.h. The arc current was 700 amperes at 48 volts. The shroud gases employed were air at a pressure of 50 p.s.i.g. at a flow rate of 400 s.c.f.h. mixed with propane at a pressure of 50 p.s.i.g. at a flow rate of 90 s.c.f.h. The powdered coating material was a cobalt base alloy having a particle size of from about 10 to about 40 microns and a flow rate of 6 pounds per hour. The carrier gas was argon with a flow rate of 7 s.c.f.h. The coatings obtained were substantially superior to those normally obtained with conventional spray guns.

Figure 3:
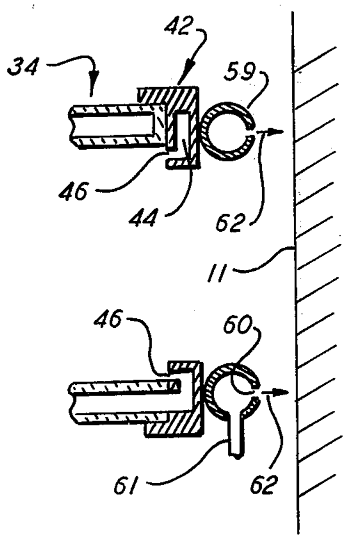
FIG. 3 is a fragmentary, medial sectional view showing the outlet portion of the plasma flame spray gun according to another embodiment of the invention.

In certain installations, an annular manifold 59, FIG. 3, is mounted on the outer end of the gas burner 42. Cooling water or an inert gas such as, for example, nitrogen or argon is supplied to this manifold through an inlet 61, and annular jet orifice outlet means 60 are provided on the side of the manifold towards the substrate 11 to provide an annular curtain effect around the plasma flame, as indicated by arrow 62. Not only does the jet spray serve to shield the spray steam, it also allows the spray cone to be controlled and furthermore serves to provide some cooling of the substrate. Similarly, the same manifold may be used with propane to provide a secondary flame shroud around the spray stream and thereby further reduce the oxide content of the coating. In certain installations it is desirable to utilize carbon dioxide for this purpose.

Figure 5:
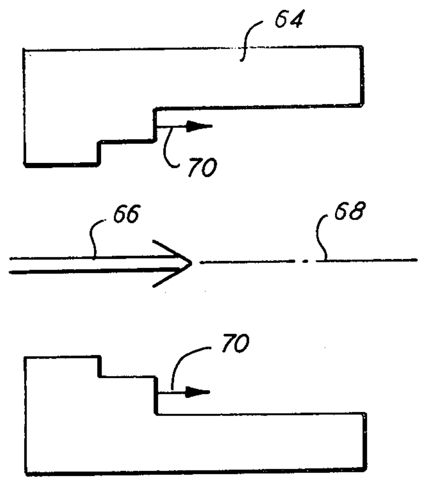
FIGS. 5 to 9 are schematic drawings each showing a wall shroud and flame shroud arrangement according to other embodiments of the invention.

While the embodiment of FIGS. 1 and 2 is the presently preferred embodiment, other desirable embodiments of the invention are illustrated in FIGS. 5 to 9. FIG. 5 shows in schematic form an annular wall shroud 64 with plasma flame or effluent 66 passing longitudinally therethrough along an axis indicated at 68. In this embodiment, an annular flame shroud 70 is directed parallel to the direction of flow of the plasma effluent.

Figure 6:
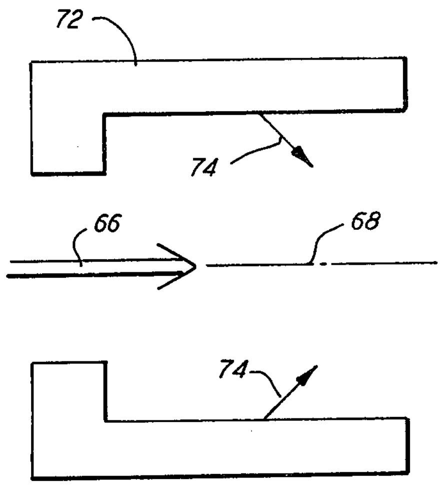

In the embodiment of FIG. 6, the plasma effluent 66 passes longitudinally along its axis 68 through an annular wall shroud 72, and an annular flame shroud 74 is directed at an angle having a component extending parallel to the direction of flow of the plasma effluent.

Figure 7:
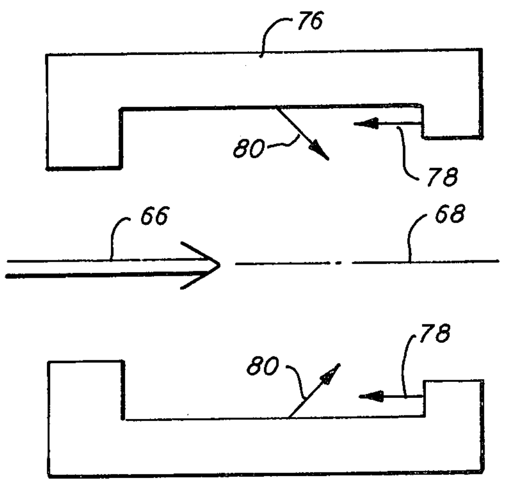

Referring next to the embodiment of FIG. 7, the plasma effluent 66 passes longitudinally along its axis 68 through an annularly-shaped wall shroud 76, and a portion of the gas for forming the flame shroud is introduced, as indicated at 78, at an angle of about 180° with respect to the axis 68 of the plasma effluent or flame, and a second portion of the gas for forming the flame shroud is introduced, as indicated at 80, at an angle having a component extending parallel to the direction of flow of the plasma effluent.

Figure 8:
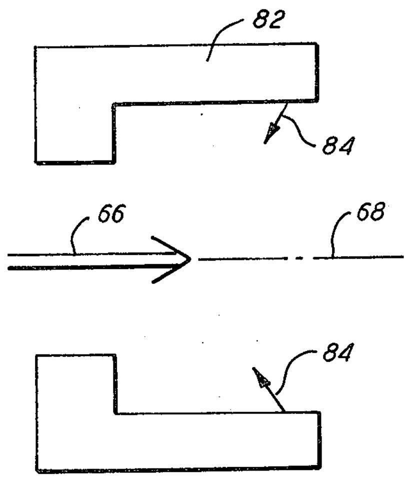

In the embodiment of FIG. 8, the plasma effluent 66 passes longitudinally along its axis 68 through an annular wall shroud 82, and an annular flame shroud 84 is directed at an angle having a component extending in a direction opposite to the direction of flow of said plasma effluent.

Figure 9:
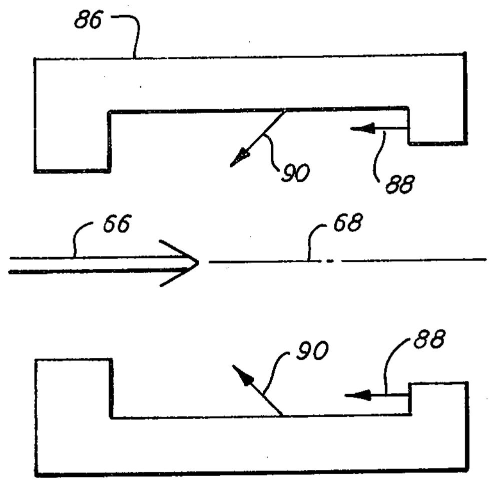

FIG. 9 shows an embodiment of the invention wherein the plasma effluent 66 passes longitudinally along the axis 68 through an annular wall shroud 86. A portion of the gas for forming the flame shroud is introduced, as indicated at 88, at an angle of about 180° with respect to the axis 68 of the plasma effluent and a second portion of the gas for forming said flame shroud is introduced, as indicated at 90, at an angle having a component extending in a direction opposite to the direction of flow of the plasma effluent.

Thus, it will be appreciated that the gas for forming the flame shroud may be introduced at one or more inlets and each inlet may be disposed at any angle from about zero to about 180°, and may even be normal to the direction of flow of the plasma effluent.

It will thus be seen that the present invention does indeed provide a new and improved plasma spray gun assembly which is superior to conventional spray guns with respect to deposition efficiency, reduced oxide contents, reduced unmelted particle inclusions, as well as other operative characteristics.

Having thus described the invention with particular reference to the preferred forms thereof, it will be obvious to those skilled in the art to which the invention pertains, after understanding the invention that various changes and modifications may be made therein without departing from the spirit and scope of the invention, as defined by the claims appended hereto.

What is claimed is:

1. A plasma spray gun assembly for coating substrates comprising, in combination;

- a nozzle electrode having a nozzle passage therethrough;
- a rear electrode;
- means for passing plasma-forming gas through the nozzle electrode;
- means for passing an arc-forming current between said electrodes to form a plasma effluent;
- means for introducing spray coating material into the plasma effluent;
- a wall shroud for said plasma effluent extending from the exit of the nozzle electrode; and
- means for forming a flame shroud for said plasma effluent at least within the wall shroud.

2. A plasma spray gun assembly according to claim 1 wherein said spray coating material is in the form of a powder.

3. A plasma spray gun assembly according to claim 1 wherein said means for forming a flame shroud for said plasma effluent at least within the wall shroud comprises means for directing said flame shroud at an angle of between about 160° to about 180° with respect to the axis of the plasma effluent.

4. A plasma spray gun assembly according to claim 1 wherein said means for forming a flame shroud for said plasma effluent at least within the wall shroud comprises means for directing said flame shroud at an angle of about 180° with respect to the axis of the plasma effluent.

5. A plasma spray gun assembly according to claim 4 wherein said means for forming a flame shroud for said plasma effluent at least within the wall shroud comprises burner means disposed adjacent the outlet of the wall shroud.

6. A plasma spray gun assembly according to claim 5 wherein said burner means includes an annular plenum chamber having jet orifice means directed at an angle of about 180° with respect to the axis of the plasma effluent.

7. A plasma spray gun assembly according to claim 6 wherein said burner means further includes combustion gas inlet means that pass longitudinally through said wall shroud.

8. A plasma spray gun assembly according to claim 1 further comprising means for water cooling said wall shroud.

9. A plasma spray gun assembly according to claim 1 wherein said wall shroud is of cylindrical configuration.

10. A plasma spray gun assembly according to claim 2 wherein said means for introducing powdered coating material into the plasma effluent is disposed adjacent the exit of the electrode nozzle.

11. A plasma spray gun assembly according to claim 1 wherein said means for forming a flame shroud for said plasma effluent within the wall shroud includes means for burning a high molecular weight combustion mixture.

12. A plasma spray gun assembly according to claim 11 wherein the high molecular weight combustion mixture includes propane.

13. A plasma spray gun assembly according to claim 1 further comprising means for forming an annular curtain effect around the plasma effluent as it leaves the wall shroud and passes towards the substrate.

14. A plasma spray gun assembly according to claim 13 wherein said means for forming an annular curtain effect includes an annular manifold and orifice means mounted adjacent the outer end of said wall shroud.

15. A plasma spray gun assembly according to claim 1 wherein said means for forming a flame shroud for said plasma effluent at least within the wall shroud comprises means for directing said flame shroud at an angle having a component extending parallel to the direction of flow of said plasma effluent.

16. A plasma spray gun assembly according to claim 1 wherein said means for forming a flame shroud for said plasma effluent at least within the wall shroud comprises means for directing said flame shroud at an angle having a component extending in a direction opposite to the direction of flow of said plasma effluent.

17. A plasma spray gun assembly according to claim 6 further comprising second jet orifice means directed at an angle of from about 0° to about 180° with respect to the axis of the plasma effluent.

18. A plasma spray gun assembly according to claim 6 further comprising second jet orifice means directed at an angle having a component extending parallel to the direction of flow of said plasma effluent.

19. A plasma spray gun assembly according to claim 6 further comprising second jet orifice means directed at an angle having a component extending in a direction opposite to the direction of flow of said plasma effluent.

20. A plasma spray gun assembly according to claim 1 wherein said wall shroud has a radially-inwardly directed lip portion disposed towards the exit end thereof.

21. A process for plasma flame-spraying coating material onto a substrate, which comprises the steps of:

passing a plasma-forming gas through a nozzle electrode;

passing an arc-forming current between said nozzle electrode and a rear electrode to form a plasma effluent;

introducing coating material into the plasma effluent;

passing the plasma effluent longitudinally through a wall shroud extending from the exit of said nozzle electrode; and forming a flame shroud for said plasma effluent at least within the wall shroud.

22. A process for plasma flame-spraying coating material onto a substrate according to claim 21 wherein said coating material is in a powder form.

23. A process for plasma flame-spraying coating material onto a substrate according to claim 21 wherein said flame shroud is directed at an angle of between about 160° to about 180° with respect to the axis of the plasma effluent.

24. A process for plasma flame-spraying coating material onto a substrate according to claim 23 wherein said flame shroud is directed at an angle of about 180° with respect to the axis of the plasma flame.

25. A process for plasma flame-spraying coating material onto a substrate according to claim 21 further comprising the step of passing cooling water through said wall shroud.

26. A process for plasma flame-spraying coating material onto a substrate according to claim 21 further comprising the step of preheating combustion gas for the flame shroud.

27. A process for plasma flame-spraying coating material onto a substrate according to claim 21 wherein said coating material is introduced into the plasma effluent adjacent the exit of the electrode nozzle.

28. A process for plasma flame-spraying coating material onto a substrate according to claim 21 wherein a mixture for forming said flame shroud is a high molecular weight combustion mixture.

29. A process for plasma flame-spraying coating material onto a substrate according to claim 21 wherein a combustion mixture for forming said flame shroud includes propane.

30. A process for plasma flame-spraying coating material onto a substrate according to claim 21 wherein a combustion mixture for forming said flame shroud includes acetylene.

31. A process for plasma flame-spraying coating material onto a substrate according to claim 21 wherein a combustion mixture for forming said flame shroud includes MAPP gas.

32. A process for plasma flame-spraying coating material onto a substrate according to claim 21 wherein a combustion mixture for forming said flame shroud includes APACHI gas.

33. A process for plasma flame-spraying coating material onto a substrate according to claim 21 wherein a combustion mixture for forming said flame shroud includes hydrogen.

34. A process for plasma flame-spraying coating material onto a substrate according to claim 21 wherein said coating material is a fusible powdered metal.

35. A process for plasma flame-spraying coating material onto a substrate according to claim 21 wherein said coating material is a ceramic material.

36. A process for plasma flame-spraying coating material onto a substrate according to claim 21 wherein said coating material is a carbide.

37. A process for plasma flame-spraying coating material onto a substrate according to claim 21 further comprising the step of forming a fluid annular curtain around the plasma effluent as it leaves the wall shroud passing towards said substrate.

38. A process for plasma flame-spraying coating material onto a substrate according to claim 21 wherein said flame shroud is directed at an angle having a component extending parallel to the direction of flow of said plasma effluent.

39. A process for plasma flame-spraying coating material onto a substrate according to claim 21 wherein said flame shroud is directed at an angle having a component extending in a direction opposite to the direction of flow of said plasma effluent.

40. A process for plasma flame-spraying coating material onto a substrate according to claim 21 wherein a portion of the mixture for forming said flame shroud is introduced at an angle of about 180° with respect to the axis of the plasma effluent and a second portion of the mixture for forming said flame shroud is introduced at an angle of from about 0° to about 180° with respect to the axis of the plasma effluent.

41. A procsss for plasma flame-spraying coating material onto a substrate according to claim 21 wherein a portion of the mixture for forming said flame shroud is introduced at an angle of about 180° with respect to the axis of the plasma effluent and a second portion of the mixture for forming said flame shroud is introduced at an angle having a component extending parallel to the direction of flow of said plasma effluent.

42. A process for plasma flame-spraying coating material onto a substrate according to claim 21 wherein a portion of the mixture for forming said flame shroud is introduced at an angle of about 180° with respect to the axis of the plasma effluent and a second portion of the mixture for forming said flame shroud is introduced at an angle having a component extending in a direction opposite to the direction of flow of said plasma effluent.

* * * * *